No. 782,336. PATENTED FEB. 14, 1905.
P. F. HEIN.
WHEEL.
APPLICATION FILED OCT. 31, 1904.
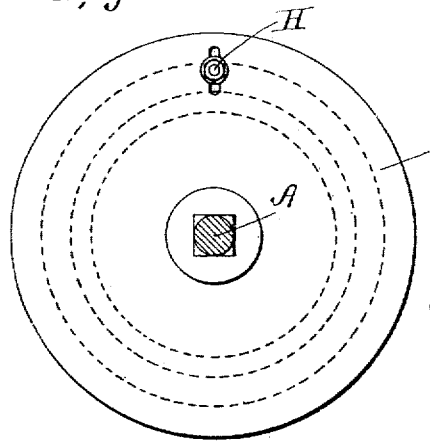
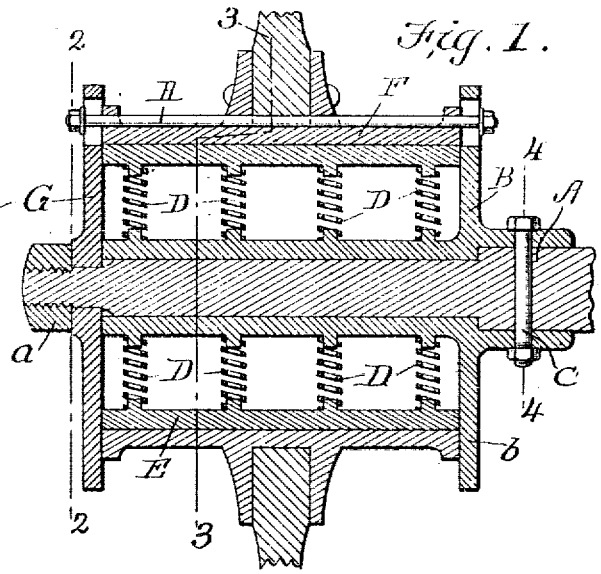
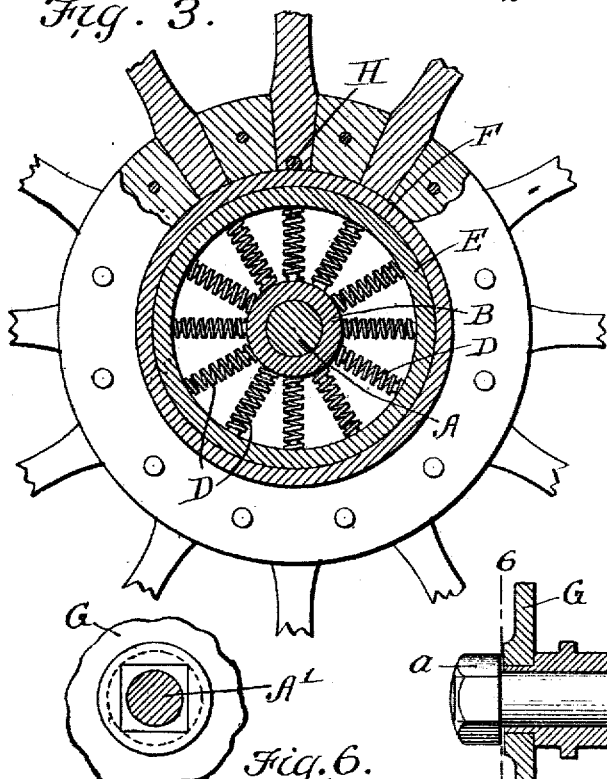
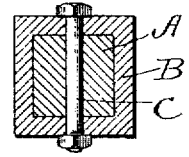
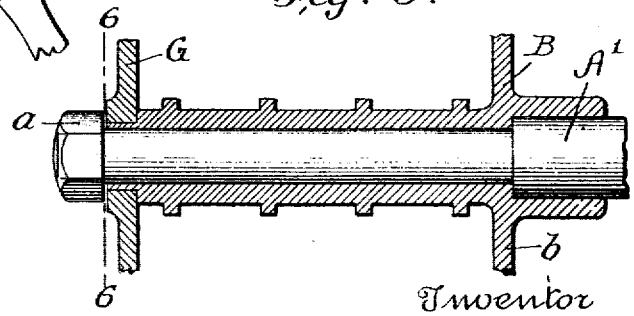
Inventor
P. F. Hein,
By his Attorney
Baldwin Wight
Witnesses
Ernest Pulsford
K. H. Fenning No. 782,336.  
Patented February 14, 1905.

UNITED STATES PATENT OFFICE.

PETER F. HEIN, OF CROWNPOINT, INDIANA, ASSIGNOR OF ONE-HALF TO WALTER L. DODD, OF WESTVILLE, INDIANA.

WHEEL.

SPECIFICATION forming part of Letters Patent No. 782,336, dated February 14, 1905.

Application filed October 31, 1904. Serial No. 230,797.

*To all whom it may concern:*

Be it known that I, PETER F. HEIN, a citizen of the United States, residing at Crownpoint, in the county of Lake and State of Indiana, have invented certain new and useful Improvements in Wheels, of which the following is a specification.

The object of my invention is to provide a wheel of improved construction which, while it is especially designed for use on automobiles, may be used to advantage on any vehicle.

My wheel is adapted to supersede pneumatic-tired wheels and wheels having springs in or near their peripheries.

As is well known, there is need for an elastic running-gear for automobiles especially, since with a rigid running-gear on an ordinary road the jar is detrimental to the motive mechanism. While the pneumatic tire is now in general use, such tires are unsatisfactory, because they are expensive to purchase, expensive to keep in repair, and of short and uncertain durability. Another class of strain-relieving wheels has a small series of comparatively strong springs in the wheel-hub, and thus provides an elastic support for the vehicle composed of a small number of parts, all of which being heavy are not readily displaced or broken. It is to this class that my invention relates.

In carrying out my invention I provide an axle-skein mounted non-rotatively on the axle and surrounded by a sleeve which abuts against a disk rigid with the axle-skein at its inner end. Interposed between the axle-skein and the sleeve is a plurality of springs, and on its outer surface the sleeve carries a ring which supports the tire of the wheel. On the outer end of the axle and retained by a nut is a disk which holds the sleeve and tire-supporting ring in position. Rigid with the tire-supporting ring is a bolt which extends through radial slots in both disks and permits of radial movement of the wheel-tire relatively to the axle while preventing a rotary movement independently thereof. Of course if the wheel is not to be used on the driving-axle the axle and the axle-skein will be rotatively connected.

In the accompanying drawings, Figure 1 is a central longitudinal section of my improved hub. Fig. 2 is a transverse section taken on the line 2 2 of Fig. 1, showing the slot in the disk and the non-circular section of the axle. Fig. 3 is a section taken on the line 3 3 of Fig. 1, showing the arrangement of the springs and the location of the driving-bolt. Fig. 4 is a section taken on the line 4 4 of Fig. 1, showing the non-circular section of the axle and means for attaching the axle-skein thereto. Fig. 5 is a view, part in section and part in elevation, showing a modification adapted for use when the wheel is to revolve independently of the axle. Fig. 6 is a section on the line 6 6 of Fig. 5, showing the means for attaching the outer disk to the axle-skein when the wheel is to be so used.

The driving-axle A, Fig. 1, is non-circular in cross-section, corresponding with the opening in an axle-skein B, to which it is fastened by a bolt C passing therethrough. The axle-skein has, preferably integral therewith at its inner end, a disk *b* and carries on its outer surface a series of springs D, which extend therefrom radially and whose outer ends rest against the inner surface of a sleeve E, which abuts against the disk *b* and about which is placed a tire-supporting ring F, which also abuts against the disk *b*. The sleeve and tire-supporting ring are held against the disk *b* and from lateral displacement by means of a disk G, which has a non-circular aperture at its center engaging the correspondingly-formed end of the axle, so that it and the axle are deprived of independent rotary movement. This disk is held close against the axle-skein, sleeve, and tire-supporting ring and from lateral displacement by a nut *a* on the outer extremity of the axle. When the disk G is removed, the tire-supporting ring F may be removed without disarranging or displacing the springs D. A strong bolt H, attached to the tire-supporting ring F, extends through the radial slots in the disks *b* and G and locks them from independent rotary movement while allowing of relative radial movement, thus giving full play to the elastic tendency of the springs D.

When rotary motion is imparted to the driving-axle A, it is evident that the axle-skein B and disk G will be rotated and that the sleeve E, through the springs D, will be caused to rotate. Through the bolt H, which locks the disks b and G to the tire-supporting ring F, the said ring and tire will be rotated, thus propelling the vehicle. The tire-supporting ring F is not held from radial movement, since the bolt H, to which it is attached, is mounted in radial slots in the disks G and b, and the sleeve E is held from radial movement only by the compression of the series of springs D, which are of such strength that they readily give to the inequalities of the road.

To adapt my wheel for use in the ordinary way on any vehicle, it is necessary only to have a circular axle A' and provide a corresponding circular passage-way through the axle-skein B, in which event the outer disk G will be mounted on the outer end of the axle-skein, which should be made, preferably, non-circular in section, as clearly shown in Figs. 5 and 6.

It will be seen that I have provided a compact simple device, readily accessible for cleaning and repairing and well protected from dust and dirt.

I claim as my invention—

1. The combination of a shoulder-axle, an axle-skein thereon bearing at its inner end against said shoulder, a laterally-projecting flange b at the inner end of the axle-skein, a disk G mounted on the axle and bearing against the outer end of the axle-skein, a nut on the axle for holding the disk against the axle-skein, a sleeve surrounding the axle, and held in position between the disks b and G, springs interposed between the sleeve and the axle-skein, a tire-supporting ring, fitted between the disks b and G and adapted to move transversely of the axle between said disks and a bolt secured to the tire-supporting ring and extending through radial slots in the disks whereby the tire-supporting ring is made to revolve with the axle-skein but is free to move radially relatively thereto.

2. A wheel comprising an axle-skein, provided with a laterally-projecting flange or disk b near its inner end, spiral springs loosely attached to the axle-skein and arranged radially relatively thereto, a sleeve surrounding the springs and loosely connected with the springs, a tire-supporting ring loosely surrounding the sleeve, a disk G on the axle between which and the disk or flange b the sleeve and ring are held against axial displacement and a bolt H attached to the ring and loosely engaging radial slots in the disks b and G and a nut on the axle for holding the outer disk in place.

3. The combination of a shouldered axle, an axle-skein secured to the axle and bearing against said shoulder, a laterally-projecting flange or disk b on the axle-skein, a disk G on the outer end of the axle bearing against the outer end of the axle-skein, a nut on the axle for holding said disk G in place, a sleeve E surrounding the axle-skein, adapted to move radially toward and from the axle but held against endwise movement by the disks b and G, radially-arranged spiral springs interposed between the axle-skein and said sleeve, a tire-supporting ring F surrounding the sleeve and adapted at times to rotate about said sleeve and which bears directly against the disks b and G by which it is held from endwise displacement and devices for connecting said ring with the disks whereby the ring is caused to rotate with the disks, substantially as described.

4. The combination of an axle, an axle-skein permanently connected therewith, and having a laterally-projecting flange or disk b, a disk G on the outer end of the axle bearing against the end of the axle-skein, a sleeve surrounding the axle-skein and interposed between the disks b and G, springs interposed between the sleeve and the axle-skein, a tire-supporting ring surrounding the sleeve and held between the disks b and G and which is movable endwise relatively to the sleeve when the disk G is detached In testimony whereof I have hereunto subscribed my name.

PETER F. HEIN.

Witnesses:
 D. C. BITZER,
 OTTO SEBERGER.